Feb. 15, 1955     H. S. GOSS     2,701,954
METHOD OF CONDITIONING AND PRESERVING PERISHABLE PRODUCE
Filed Aug. 21, 1952     2 Sheets-Sheet 1
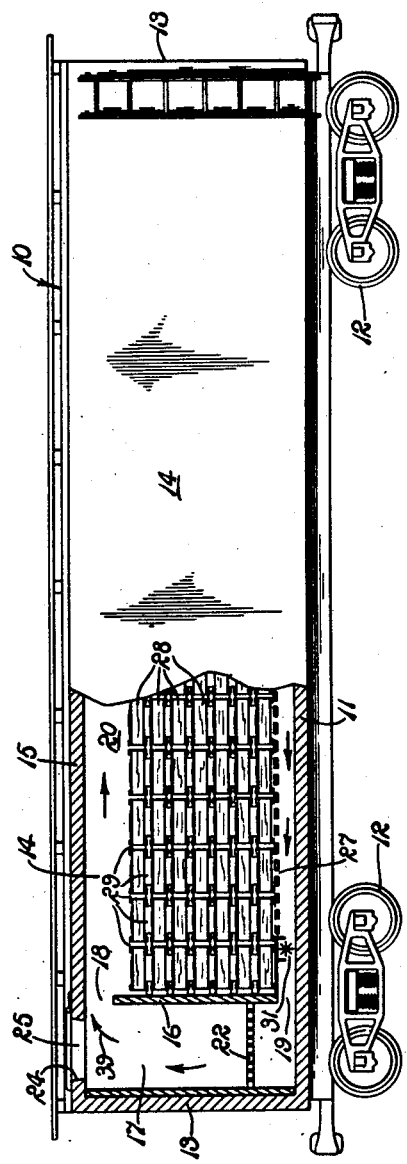
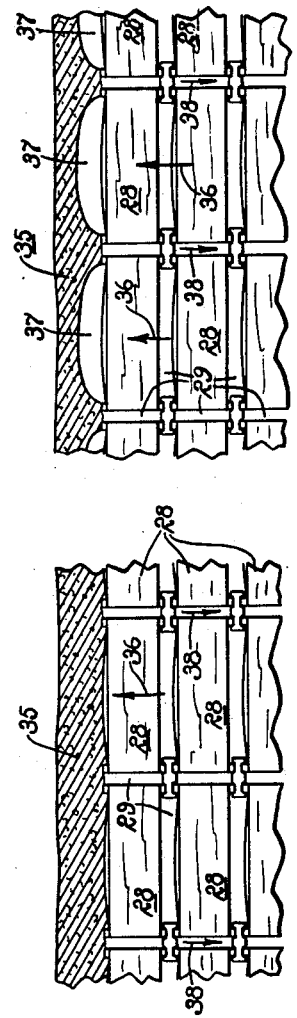
HUBERT S. GOSS
INVENTOR
HUEBNER, BEEHLER,
WORREL & HERZIG
ATTORNEYS Feb. 15, 1955    H. S. GOSS    2,701,954
METHOD OF CONDITIONING AND PRESERVING PERISHABLE PRODUCE
Filed Aug. 21, 1952    2 Sheets-Sheet 2

HUBERT S. GOSS
INVENTOR
HUEBNER, BEEHLER,
WORREL & HERZIG
ATTORNEYS
BY

United States Patent Office 2,701,954
Patented Feb. 15, 1955

2,701,954

METHOD OF CONDITIONING AND PRESERVING PERISHABLE PRODUCE

Hubert S. Goss, Fresno, Calif.

Application August 21, 1952, Serial No. 305,661

11 Claims. (Cl. 62—170)

The present invention relates to the conditioning and preservation of perishable produce and more particularly to an improved method of cooling such produce while maintaining moisture conditions in the environment of the produce within limits conducive to the maintenance of optimum produce quality. Although the instant cooling method is excellently suited to the conditioning and preservation of perishable produce constituting the lading of railway cars during movement to market, and is described in connection with such use, it is to be understood that the method also may be utilized in warehouses, refrigerated storage plants, and other locations where comparable problems are encountered.

It has long been known to ship perishable produce such as fruits, vegetables and the like to market in refrigerated railway cars. Such cars conventionally provide a central compartment into which the produce is loaded and bunkers at opposite ends of the compartment adapted to receive ice for cooling purposes. Air is circulated through such compartments and bunkers to cool the produce. Inasmuch as produce laded into such cars usually possesses considerable latent heat, a protracted period of time usually elapses before the circulation of air through the compartments and the bunkers can transfer the heat from the produce to the ice. This not only gives insufficient protection to the produce and results in its reaching market in less than its best condition but by melting the ice more rapidly than desired it is necessary to make one or more additional stops between carloading stations and destinations for the produce to replenish the ice. This is not only of additional expense and inconvenience but delays transmission and further aggravates the problems of produce preservation.

As a result, it has become popular to precool produce laded into railway cars by circulating chilled air through such cars in order to lower the produce to a calculated desirable preservation temperature preliminary to shipment. Such precooling is effected by auxiliary refrigeration equipment which forces air through railway cars attached thereto and withdraws the air from such cars for re-circulation through the cars. The refrigeration serves to remove moisture from the air and as a result an undesirable dehydrating effect is imposed upon the produce.

Further, limitations in precooling equipment generally, delays the marshalling of numerous railway cars into a train for movement to market. Such delay precludes the utilization of the railway cars and loading equipment with maximum efficiency and increases the hazards of deterioration of the produce by lengthening the span between packing and marketing operations.

"Top icing" has been adopted by many produce shippers as a refrigeration expedient which does not involve substantial delay in shipment and which removes latent heat from the produce quickly and inexpensively. "Top icing" consists in spraying a layer of ground ice on top of produce packed for shipment from six to eight inches thick. The ice layer absorbs heat from the produce and in so doing is melted. It has been discovered that during the initial melting of the ice layer, the released water serves to increase the humidity of the environmental air for the produce which is of advantage in the conditioning and preservation of most produce. However, when the layer melts through, a substantial quantity of water is discharged onto the produce, and labels, wrapping material, boxes, cartons, cases, and the like utilized with the produce. This wetting action precludes top icing of many types of produce and obviously damages such labels, wrapping materials and containers so as to lower the durability of the produce.

The "Cooling Apparatus for Vegetables and Fruits," shown in my United States Patent No. 2,538,362, made possible for the first time the top icing of produce so as to chill the same while shielded from the water dropped by melting "top ice." Although said apparatus has successfully accomplished its objective and in many operations is the preferred manner of refrigerating produce, it does constitute an additional expense to produce marketing, in some instance impedes ventilation, and is subject to disadvantages in certain operations which the present invention has overcome.

An object of the present invention is to improve the quality and appearance of perishable produce delivered to market.

Another object is to obviate excessive moisture in the "top icing" of perishable produce.

Another object is to remove the latent heat of perishable produce by "top icing" without subjecting such produce, their labels, wrapping materials or the like, and their boxes, cartons, cases or other containers to excessive moisture incident to the melting of the ice.

Another object is to supply desirable humidity to the environmental atmosphere of perishable produce during the cooling thereof.

Further objects are to provide an improved method and steps therein for preserving and conditioning perishable produce during shipment to market that is convenient and economical to employ, suitable on fruits and vegetables of all types, and fully effective in accomplishing its intended purposes.

In the drawings:

Fig. 1 is a side elevation of a refrigerated railway car of well known form partially broken away to illustrate positions of perishable produce laded therein and a first step in the method of the present invention.

Fig. 2 is a somewhat enlarged fragmentary side elevation of the produce laded in the railway car of Fig. 1 illustrating the arrangement of a layer of ground ice in covering relation thereto.

Fig. 3 is a view similar to Fig. 1 illustrating the manner in which the layer of ice melts during an initial step in the practice of the present invention.

Figure 4:
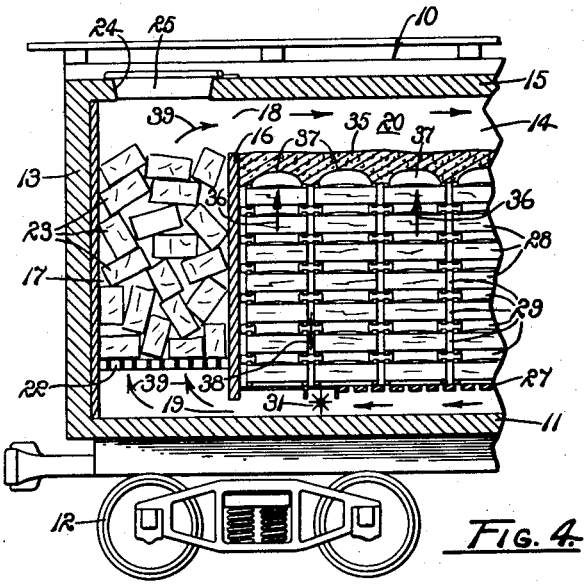
Fig. 4 is an enlarged fragmentary longitudinal section of the railway car and contents shown in Fig. 1 illustrating a succeeding step.

Referring in greater detail to the drawings, a conventional refrigerated railway car is indicated generally at 10 to exemplify structures generally into which produce is laded for transportation or storage purposes and in which it is desired to refrigerate and condition the produce. Such railway cars provide floors 11 supported on trucks 12 having opposite end walls 13, side walls 14 and a roof 15. Inner end walls 16 are provided in inwardly spaced relation to the end walls 13 and define ice bunkers 17 having an upper opening 18 and a lower opening 19 communicating with the portion of the car intermediate the inner end walls 16, constituting a compartment 20.

A perforate grate 22 is provided in the bunker 17, as shown in Fig. 4, to receive chunks of ice 23 deposited into the bunker through an opening 24 closed by a removable cover 25.

A slatted floor 27 is provided in the compartment 20 in spaced relation to the floor 11 to receive boxes 28 or other containers of produce in ventilated stacked relation thereon. It is to be understood that the produce may be arranged in the compartment 20 on the slatted floor 27 in any manner desired but the boxes or other containers thereof are preferably so arranged as to provide vertical and horizontal air passages 29 therethrough for ventilation, refrigeration, and/or fumigation efficiency. In the drawings, the boxes are shown laded into the compartment 20 in ventilative spaced relation by means of the "Superior Block Load" shown and described in United States Patent No. 2,589,718. It is to be understood that the boxes may be loaded according to the "Hoak" load of Patent No. Re. 22,256, the "Martin Load" of Patent No. 2,565,567 or any other suitable arrangement which is simply exemplified by reference to such loads.

It is the usual practice to mount a blower 31 below the slatted floor 27 and to drive such blower by any suitable means, not shown, so as to draw air from beneath the slatted floor 27, force the air into the bunker 17 through the lower opening 19, upwardly through the grate 22 and any ice 23 supported thereon, and through the upper opening 18 back into the compartment.

The structure described to this point is of well known form and is referred to for convenience in describing the method of the subject invention.

In the refrigerating and conditioning of produce according to the instant method, the boxes 28 of produce are laded into the compartment 20 in the manner shown or in any other suitable arrangement. As distinguished from the conventional practice, no ice need initially be provided in the bunkers 17. A porous layer 35 of ground ice is sprayed or otherwise arranged in covering relation to the boxes 28 and rested thereon. In this particular, the first step is similar to that in the conventional cooling of such produce as peas, lettuce, cauliflower, spinach, cabbage, celery and certain leafy vegetables which are at least partially tolerant to excessive moisture.

Latent heat from the produce causes an expansion of environmental air adjacent thereto which rises convectionally into the layer 35, as shown by the arrows 36 in Fig. 3. The heat absorbed by the air from the produce melts the underside of the layer, as shown in Fig. 3, to provide downwardly disposed concavities 37 in the layer directly above each stack of boxes 28. The air may pass convectionally upwardly through the porous layer for return beneath the slatted floor 27 for re-circulation or, because of cooling, may descend adjacent to the boxes, as indicated by the arrows 38 for re-circulation. It will be noted that no mechanical motivation of the air is required for this initial cooling of the produce but it will also be understood that the blower 31 or any other suitable means for circulating the air may be utilized if desired. If the air is mechanically motivated during this removal of the latent heat, it is usually circulated upwardly through the bunker and downwardly through the produce in the direction of circulation indicated by the arrows 39 in Fig. 1, because such circulation is normally accomplished by the conventional blowers 31 of refrigerated railway cars.

A significant feature of the subject invention is the discovery that during the melting of the underside of the layer 35 to form the concavities 37, no substantial dripping occurs. The moisture is drawn upwardly in the layer and substantially saturates the same. Such upward movement may be due to a capillary attraction of the water between the particles of the ground ice or simply incident to the tendency for water to condense from humid air at the coldest point.

A sufficient layer 35 of ice is provided to reduce the temperature of the produce to a predetermined optimum preservation level. This temperature varies a great deal according to the type of produce involved. Subsequent to the cooling of the produce and prior to any substantial discharge of water from the layer 35, the circulation of air through the boxes by mechanical means is initiated. The air may be motivated by the blower 31, or any other suitable means, but is preferably caused to travel successively beneath the slatted floor 27, through the lower opening 19, upwardly through the bunker 17, through the upper opening 18, and downwardly through the laded produce in the closed path represented by the arrows 39. A cold point is established in the path of the air remote to the produce. This is conveniently accomplished by depositing a supply of ice in the bunker 17 after the produce has been cooled and before the layer 35 discharges any substantial quantity of water and applying salt thereto so that the temperature in the bunker is below the temperature of the melting ice in the layer 35.

As the air is circulated, it is at least somewhat warmed by the produce, further melts the ice in the layer 35 and absorbs moisture therefrom, is passed upwardly through the bunker 17 where it is chilled and water vapor condenses therefrom and is recirculated through the produce in a chilled and dried condition. The temperature in the bunker is preferably maintained slightly below 32° F. until the layer 35 has melted and the water incident to such melting been carried into the bunker for condensation therein.

When the layer 35 has disappeared, the temperature of the bunker is raised sufficiently to avoid freezing the produce. This is conveniently accomplished by simply flushing the salt from the ice 23 in the bunker or by replacing the ice, as convenience suggests.

The mechanical circulation of air through the produce is continued and the ice in the bunker serves to maintain the produce in a cooled and sufficiently humid condition for optimum preservation.

Figure 5:
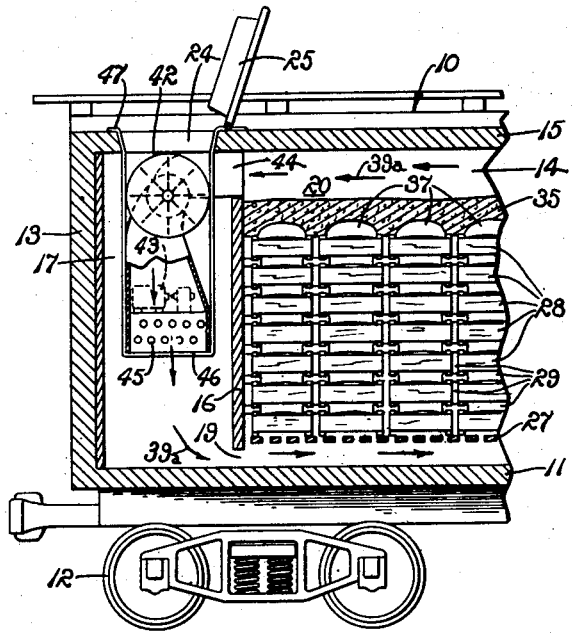
Fig. 5 is a view similar to Fig. 4 illustrating a modified method of cooling produce in the car subsequent to the removal of latent heat therefrom and reduction in temperature of the produce to a calculated optimum preservation level.

It will be apparent that the air circulated through the produce and layer 35 during the period when it is desired to remove the moisture from the compartment 20, may be chilled and dried in any suitable manner. While the salting of the ice 20 is economical, simple, and effective, an additional method of cooling and drying the air is illustrated in Fig. 5.

An air blower 42 and refrigeration system 43 may be conveniently lowered into the bunker. The air blower preferably provides an intake 44 which is connected to the upper opening 18 of the bunker wall 16. The blower is motivated to draw air from above the layer 35, and subsequent to melting of the layer from above the boxes 28, and to force the air downwardly through an evaporator 45 of the refrigeration system for return beneath the slatted floor 27 and upwardly through the boxes 28 as indicated by the arrows 39a in Fig. 5. When such a device is utilized, the blower and refrigeration system are preferably mounted for unitary positioning on a suitable frame 46 which may be suspended in the bunker, as by means of hangers 47. While, as stated, motivation of air through the salted ice pack 23 of Fig. 4 is preferably clockwise, as viewed and as indicated by the arrows 39, motivation of air through the evaporator 45 of Fig. 5 is preferably counter-clockwise as viewed and as indicated by the arrows 39a. Neither direction is critical to the practice of the method of the subject invention, however, and either type of circulation is permissible with any type of cold point in the bunker 17. The direction of air circulation shown in Fig. 5 has the advantage of inhibiting the dripping of water from the layer of ice.

In the practice of the present invention, the blower need not be operated during the initial cooling of the produce by the layer 35 of ice unless circulation of the air in addition to the convectional circulation is desired.

During the successive step when it is desired to transfer moisture from the layer to the bunker, the blower 42 is actuated and the refrigeration system 43 so regulated that the evaporator 45 provides a cold point in the air circulation system at a temperature below that of the melting ice in the layer. Shortly after the melting of the layer 35 and the carrying of the water thereof into the bunker, the temperature of the evaporator is raised so as to avoid freezing the produce but still maintained at a sufficiently low level properly to cool the particular produce involved.

Many other materials and apparatus for chilling and cooling the air during the moisture removal step will readily occur to anyone skilled in the art.

*Operation*

The operation of the present invention is believed to be clearly apparent and is briefly summarized at this point. Subsequent to the arrangement of the boxes 28, a calculated quantity of ice sufficient to remove the latent heat from the produce is sprayed or otherwise arranged in the layer 35. At this point the car 10 is sealed and may be started on its way to market, marshalled with other cars, or permitted to remain on a siding, as convenience suggests, without damage to the produce The length of time required to cool the produce is readily calculated or determined by trial and error experience. When such cooling has been accomplished and before the layer 35 has discharged water onto the produce, the bunkers 17 are iced and salted, the blower 42 and refrigeration system 43 installed, or other means effected for providing a cold point in the bunker and circulation of air through the boxes. In conveyance to market, this is usually accomplished at a prearranged station.

At a subsequent station, and in time spaced relation to the provision of the cold point sufficient to remove the layer 35 and water thereof, the salt is flushed from the ice 23 in the bunker, the temperature of the evaporator 25 raised as described, or other means effected for raising the temperature of the cold point sufficient to avoid freezing the produce and low enough to accomplish continued cooling thereof. The present invention has made possible "dry top icing." It is effectively utilized with produce tolerant or partially tolerant to exposure to water as well as with such produce as citrus fruit, peaches, nectarines, plums, grapes and the like which must be shielded from moisture or surface water during storage or shipment. The method provides excellent initial cooling with sufficient moisture in the environmental atmosphere to preclude dehydration as experienced by conventional precooling methods. No delay in the shipment of produce is required to effect precooling. Labels, wrapping materials, boxes, cartons, cases and the like are shielded from water damage experienced by conventional top icing. The method is economical to employ, requires no specialized equipment, and is thoroughly effective in accomplishing its intended purposes.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent methods and processes.

Having described my invention what I claim as new and desire to secure by Letters Patent is:

1. A method of cooling and conditioning perishable produce housed in a compartment comprising arranging a layer of granulated ice above the produce in heat exchanging relation to the produce, cooling the produce by absorption of heat from the produce into the underside of the layer of ice, and subsequent to cooling of the produce and prior to the release of water from the ice layer onto the produce passing chilled dry air through the produce and ice layer at a rate and quantity sufficient to absorb substantially all of the water resulting from melting of the ice by the time such melting is completed.

2. A method of refrigerating perishable produce housed in a compartment comprising covering the produce with a porous layer of granulated ice sufficient to absorb latent heat from the produce and to reduce the heat of the produce to a predetermined preserving temperature above the melting point of the ice; cooling the produce to approximately said predetermined preserving temperature by absorption of heat from the produce into the underside of the layer of ice whereby said underside is melted to release water vapor into the air and excess water is drawn upwardly into the remaining granulated ice of the layer; subsequent to cooling of the produce and prior to melting of the granulated ice layer sufficiently to drop moisture onto the produce, circulating chilled air through the produce, the ice layer, and back through the produce; and removing moisture from the circulated air after it passes through the ice layer and before its return to the produce whereby moisture incident to the melting of the ice in the layer is removed by the circulated air at a rate sufficient to avoid release of water onto the produce.

3. A method of preserving perishable produce constituting the lading of a railway car comprising covering the produce with a porous layer of granulated ice; cooling the produce by means of the layer until the underside of the layer is melted and moisture incident to such melting has passed upwardly into the upper unmelted portion of the layer substantially saturating such unmelted portion; passing an air stream in a closed path through the produce, layer, and back through the produce; and removing moisture from the air stream at a point remote from the produce until the layer of ice has melted.

4. A method of preserving perishable produce constituting the lading of a railway car comprising covering the produce with a porous layer of granulated ice; cooling the produce by means of the layer until the underside of the layer is melted and moisture incident to such melting has passed upwardly into the upper unmelted portion of the layer substantially saturating such unmelted portion; passing an air stream upwardly through the produce and saturated unmelted portion of the layer, past a moisture collection point having a temperature lower than that of the ice layer, and back upwardly through the produce until the moisture saturated layer is melted and the moisture thereof conveyed to the collection point; and raising the temperature of the moisture collection point to a predetermined produce refrigerating temperature while continuing to circulate air through the produce and past the moisture collection point.

5. A method of preserving perishable produce in transit comprising covering the produce with a porous layer of granulated ice; cooling the produce by convectional currents of air which serve to melt the underside of the layer of ice and cause the moisture incident to such melting to move upwardly in the unmelted portion of the layer; providing a point of moisture collection remote from the produce at a temperature below substantially about 32° F.; circulating air in a circuitous path successively through the produce, ice layer, past the moisture collection point and back to the produce, beginning after a substantial portion of the ice layer has melted and before moisture has dripped therefrom and continuing until the ice layer has melted and substantially all of the moisture incident thereto has been carried to the collection point; and upon completion of the carrying of the moisture to the collection point raising the temperature of the collection point above substantially about 32° F. and continuing to circulate air through the produce and past the moisture collection point to continue the refrigeration of the produce.

6. A method of preserving perishable produce in transit constituting the lading of a railway car comprising covering the produce with a porous blanket of granulated ice sufficient to remove latent heat from the produce and to lower the temperature of the produce approximately to a predetermined optimum preservation temperature above 32° F. whereby the underside of the layer is melted and the moisture incident to such melting passes upwardly into the unmelted portion of the layer of ice substantially saturating the same, introducing an air stream to the car below the produce and circulating the air upwardly through the produce and saturated layer of ice and back into the car below the produce by way of a moisture removing station remote from the produce, maintaining the temperaure of the moisture removing station below 32° F. until the ice layer is melted and the moisture incident to such melting is conveyed by the air stream to said station but for a period insufficient to lower the temperature of the produce appreciably below its optimum preservation temperature, and following the melting of the ice layer raising the temperature of the collection station to a temperature above 32° F. but sufficiently cool to maintain the produce at approximately its optimum preservation temperature.

7. A method of conditioning perishable produce constituting the lading of a railway car having an ice bunker in an end thereof comprising arranging a porous layer of ice over the produce, cooling the produce by the absorption of heat from the produce into the underside thereof whereby the underside is melted to release water vapor into the air and excess water incident to the melting is drawn upwardly into the remaining ice layer substantially to saturate the same, subsequent to the cooling of the produce and prior to complete saturation of the ice layer incident to melting withdrawing air from the car above the layer of ice into the bunker and returning the air from the bunker below the produce, refrigerating the air in the bunker by subjection to a temperature lower than the temperature of the ice layer to remove moisture therefrom while continuing to withdraw air from above the layer and to return the air below the produce until the ice layer has melted and the moisture incident to such melting carried into the bunker, and subsequent to the melting of the ice layer continuing to circulate air through the produce and the bunker and refrigerating the air as it passes through the bunker to a temperature higher than that to which the air was subjected to remove moisture therefrom.

8. A method of cooling and conditioning perishable produce comprising arranging a porous layer of ice on top of the produce in heat exchanging relation to the produce, cooling the produce by means of the layer of ice until the underside of the layer is melted and moisture incident to such melting is drawn upwardly into the upper unmelted portion of the layer by surface tension of the water at least partially saturating the unmelted portion, and passing a stream of chilled unsaturated air through the layer of ice commencing before there has been any substantial discharge of water from the layer, the air stream being in volume sufficient to absorb substantially all of the water resulting from melting of the ice by the time such melting is completed to avoid release of water onto the produce.

9. A method of preserving perishable produce comprising covering the produce with a porous layer of ice; cooling the produce by means of the layer of ice until the underside of the layer is melted and moisture incident to such melting is drawn upwardly into the upper unmelted portion of the layer by surface tension of the water at least partially saturating said unmelted portion; and passing a stream of unsaturated air through the produce and unmelted portion of the layer in a circuitous path past a moisture collection station remote from the produce adapted to remove water from the air stream absorbed thereby from the layer of ice, whereby substantially all of the water of the melting ice is conveyed by the air stream to the moisture collection station.

10. A method of preserving perishable produce comprising covering the produce with a porous layer of granulated ice; cooling the produce by convectional currents of air which serve to melt the underside of the layer of ice, moisture incident to the melting of the ice moving upwardly into the unmelted portion of the layer; providing a point of moisture collection remote from the produce at a temperature below substantially about 32° F.; circulating air in a circuitous path through the produce and ice layer and past the moisture collection point beginning after a substantial portion of the ice layer has melted and before any substantial portion of the moisture has dripped therefrom and continuing such circulation until the ice layer has melted and substantially all of the moisture incident thereto has been absorbed by the circulated air; and upon substantial completion of the absorption of the moisture by the air raising the temperature of the collection point above substantially about 32° F. but sufficiently cool to maintain the produce in a refrigerated condition and continuing to circulate the air through the produce and past the moisture collection point to continue the cooling of the produce.

11. A method of preserving perishable produce comprising covering the produce with a porous layer of granulated ice predetermined sufficient to remove latent heat from the produce and to lower the temperature of the produce approximately to a predetermined optimum preservation temperature whereby the underside of the layer is melted and the moisture incident to such melting passes upwardly into the unmelted portion of the layer of ice, circulating an air stream through the produce and layer of ice by way of a moisture removing station remote from the produce, maintaining the temperature of the moisture removing station below the temperature of the ice until the ice layer is melted and the moisture incident to such melting is absorbed into the air stream but for a period insufficient to lower the temperature of the produce appreciably below its optimum preservation temperature, and following the melting of the ice layer raising the temperature of the collection station above its initial temperature but sufficiently cool to maintain the produce approximately at its optimum preservation temperature.

References Cited in the file of this patent

UNITED STATES PATENTS

| | | |
|---|---|---|
| 1,872,937 | Greene | Aug. 23, 1932 |
| 2,278,827 | Chiardio | Apr. 7, 1942 |
| 2,299,177 | Reilly | Oct. 20, 1942 |